(12) United States Patent  
Shimizu (10) Patent No.: US 12,213,471 B2  
(45) Date of Patent: Feb. 4, 2025

(54) FISHING SPINNING REEL

(71) Applicant: GLOBERIDE, Inc., Tokyo (JP)

(72) Inventor: Yoshihito Shimizu, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 13 days.

(21) Appl. No.: 18/072,405

(22) Filed: Nov. 30, 2022

(65) Prior Publication Data

US 2023/0165233 A1     Jun. 1, 2023

(30) Foreign Application Priority Data

Nov. 30, 2021    (JP) ................................. 2021-193814

(51) Int. Cl.
     *A01K 89/01*      (2006.01)
     *A01K 89/015*     (2006.01)

(52) U.S. Cl.
     CPC ............................... *A01K 89/0179* (2015.05)

(58) Field of Classification Search
     CPC ............ A01K 89/0111; A01K 89/0123; A01K 89/0124; A01K 89/0179
     See application file for complete search history.

(56) References Cited

U.S. PATENT DOCUMENTS

| | | | | |
|---|---|---|---|---|
| 2,558,896 A | * | 7/1951 | Young | A01K 89/03 |
| | | | | 242/246 |
| 5,192,036 A | * | 3/1993 | Sato | A01K 89/033 |
| | | | | 242/268 |
| 5,221,057 A | * | 6/1993 | Yoshikawa | A01K 89/0117 |
| | | | | 242/247 |
| 2006/0169815 A1 | | 8/2006 | Maeder | |
| 2008/0142628 A1 | | 6/2008 | Kitajima et al. | |
| 2011/0011968 A1 | * | 1/2011 | Ikuta | A01K 89/015 |
| | | | | 242/307 |
| 2012/0018562 A1 | * | 1/2012 | Takamatsu | A01K 89/015 |
| | | | | 242/307 |

FOREIGN PATENT DOCUMENTS

| | | | | |
|---|---|---|---|---|
| DE | 102019213348 A1 | * | 3/2020 | ............. A01K 89/01 |
| JP | H06-197670 A | | 7/1994 | |
| JP | H6-81264 U | | 11/1994 | |
| JP | H0684859 U | * | 12/1994 | ......... A01K 89/0123 |

(Continued)

OTHER PUBLICATIONS

Office Action for related Taiwanese Application No. 111141663; action dated Jul. 7, 2023; (12 pages).

(Continued)

*Primary Examiner* — Emmanuel M Marcelo
(74) *Attorney, Agent, or Firm* — Oliff PLC (57) ABSTRACT

A sound generator comprises a protrusion and a recess that are alternatingly disposed in a circumferential direction. The recess comprises a first apex that is a boundary with one adjacent protrusion, a first face that is continuous to the first apex, and is recessed in a radially outward direction, a second face that is continuous to the first face, and a second apex that is continuous to the second face, and is a boundary with the other protrusion that is adjacent to the recess. A length L2 from the second apex to a deepest portion of the recess is longer than a length L1 from the first apex to the deepest portion of the recess.

2 Claims, 10 Drawing Sheets

(56) References Cited

FOREIGN PATENT DOCUMENTS

| | | | |
|---|---|---|---|
| JP | 2004105097 A | 4/2004 | |
| JP | 2005073670 A | 3/2005 | |
| JP | 3706767 B2 | 10/2005 | |
| KR | 200357360 Y1 * | 7/2004 | ......... A01K 89/0179 |
| KR | 200361647 Y1 * | 9/2004 | ......... A01K 89/0179 |
| WO | WO-0245502 A1 * | 6/2002 | ............. A01K 89/01 |

OTHER PUBLICATIONS

European Search Report for related European Application No. 22209866.7; action dated May 11, 2023; (9 pages).
Nov. 29, 2023 Office Action issued in Australian Patent Application No. 2022279447.
Jul. 23, 2024 Office Action issued in Japanese Application No. 2021-193814.
Jun. 3, 2024 Office Action issued in Chinese Application No. 202211474380.3.
Aug. 12, 2024 Australian Examination Report issued in Australian Application No. 2022279447.

* cited by examiner

FISHING SPINNING REEL

CROSS-REFERENCE TO RELATED APPLICATION

This application claims priority under 35 U.S.C. § 119 to Japanese Patent Application No. 2021-193814 filed on Nov. 30, 2021 in the Japanese Patent Office, the entire contents of each hereby incorporated by reference.

FIELD

The present disclosure relates to a fishing spinning reel.

BACKGROUND

A fishing spinning reel includes a spool shaft that moves forward or backward in accordance with an operation to rotate a handle, and a spool is installed on this spool shaft (see JP 2005-073670 A). The spool is relatively rotatable relative to the spool shaft, and the spool shaft and the spool include a spool sound generation mechanism that reports relative rotation. The spool sound generation mechanism includes a sound generator that is provided on a side of the spool, and a sound generation member that is provided on a side of the spool shaft.

As described in JP 2005-073670 A, the sound generator includes, for example, a ratchet groove that is disposed on an inner peripheral face of the spool. The sound generation member includes, for example, a click claw spring including a protrusion portion that protrudes in a radially outward direction. In real fishing, when the spool has rotated in accordance with the sending-out of a fishing line, the protrusion portion of the click claw spring engages with a protrusion and a recess of the ratchet groove, and therefore click sound is generated.

SUMMARY

In JP 2005-073670 A, the recess of the ratchet groove has a semi-arc shape. Therefore, an amount of deformation of the click claw spring relative to a distance of rotation movement of the spool at the time of the sending-out of the fishing line increases, and the elastic resistance of the click claw spring is easily received during a drag operation. This causes a problem in which a smooth drag operation is hindered. Furthermore, in a conventional structure, each slider is easily worn out, and this also causes a problem of a deterioration in sound generation performance.

The present disclosure has been made in order to solve such problems, and it is an object of the present disclosure to provide a fishing spinning reel that is capable of reducing resistance during a drag operation while avoiding a deterioration in sound generation performance.

In order to solve the problems described above, the present disclosure is a fishing spinning reel comprising: a spool that is rotatably and frictionally coupled to a distal end of a spool shaft by a drag device, the spool shaft being provided in a reel body; and a spool sound generation mechanism in which a sound generator and a sound generation member are engaged with each other, the sound generator being disposed on an inner peripheral face of the spool and having an uneven shape (a protrusion and a recess), the sound generation member being provided in the spool shaft. The sound generator comprises a protrusion and a recess that are alternatingly disposed in a circumferential direction. The recess comprises a first apex that is a boundary with the protrusion that is adjacent to the recess on one side, a first face that is continuous to the first apex, and is recessed in a radially outward direction, a second face that is continuous to the first face, and a second apex that is continuous to the second face, and is a boundary with the protrusion that is adjacent to the recess on the other side. The second face is disposed on an opposite side of a direction in which the spool rotates when a fishing line has been sent out. A length L2 from the second apex to a deepest portion of the recess is longer than a length L1 from the first apex to the deepest portion of the recess.

According to the present disclosure, the length L2 is longer than the length L1, and therefore the sound generation member smoothly moves from the second face to the second apex. As a result of this, resistance in a drag operation can be decreased. Furthermore, a depth is provided in the radially outward direction on a side of the first face, and therefore an acoustic space required for sound generation can be secured. Moreover, the sound generation member smoothly moves on a side of the second face, and this can avoid abrasion of each sliding portion. Therefore, a deterioration in sound generation performance can be avoided.

Furthermore, it is preferable that the first face be a curved face, and the second face be an inclined face. According to the present disclosure, the sound generation member can be moved more smoothly from the second face to the second apex.

Moreover, it is preferable that the sound generation member comprises a click claw spring that comprises a protrusion portion that protrudes in the radially outward direction, and the protrusion portion be engaged with the sound generator. According to the present disclosure, the protrusion portion is provided, and therefore sound generation performance can be further improved.

By employing a fishing spinning reel according to the present disclosure, resistance during a drag operation can be reduced, while a deterioration in sound generation performance is avoided.

DETAILED DESCRIPTION

Figure 1:
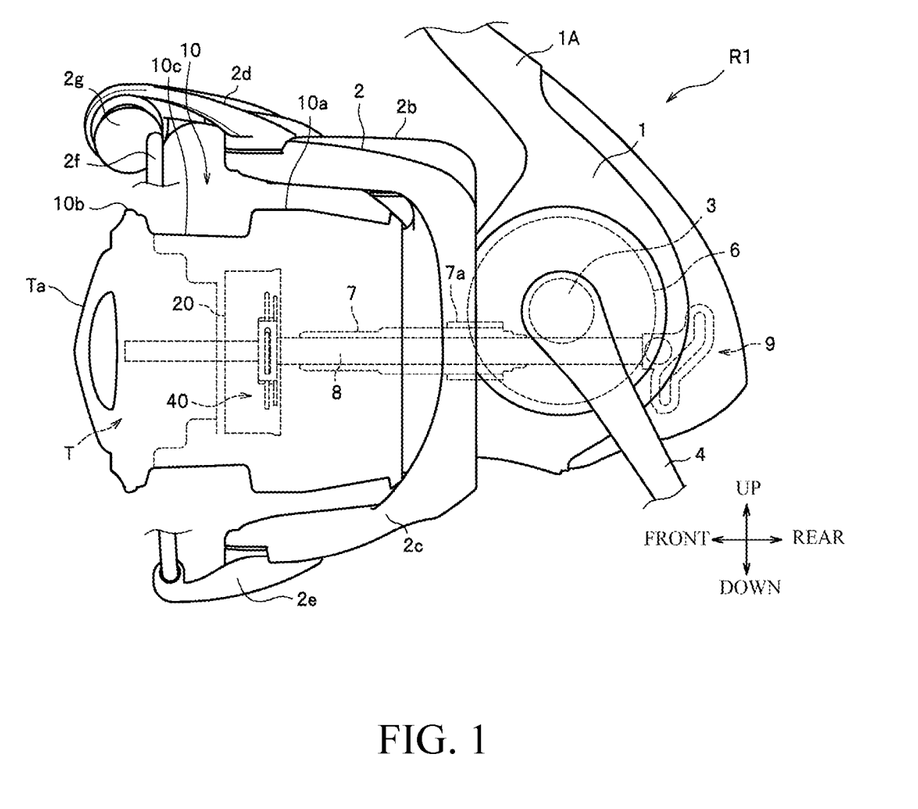
FIG. 1 is a schematic side view illustrating a fishing spinning reel according to an embodiment of the present disclosure.
Figure 2:
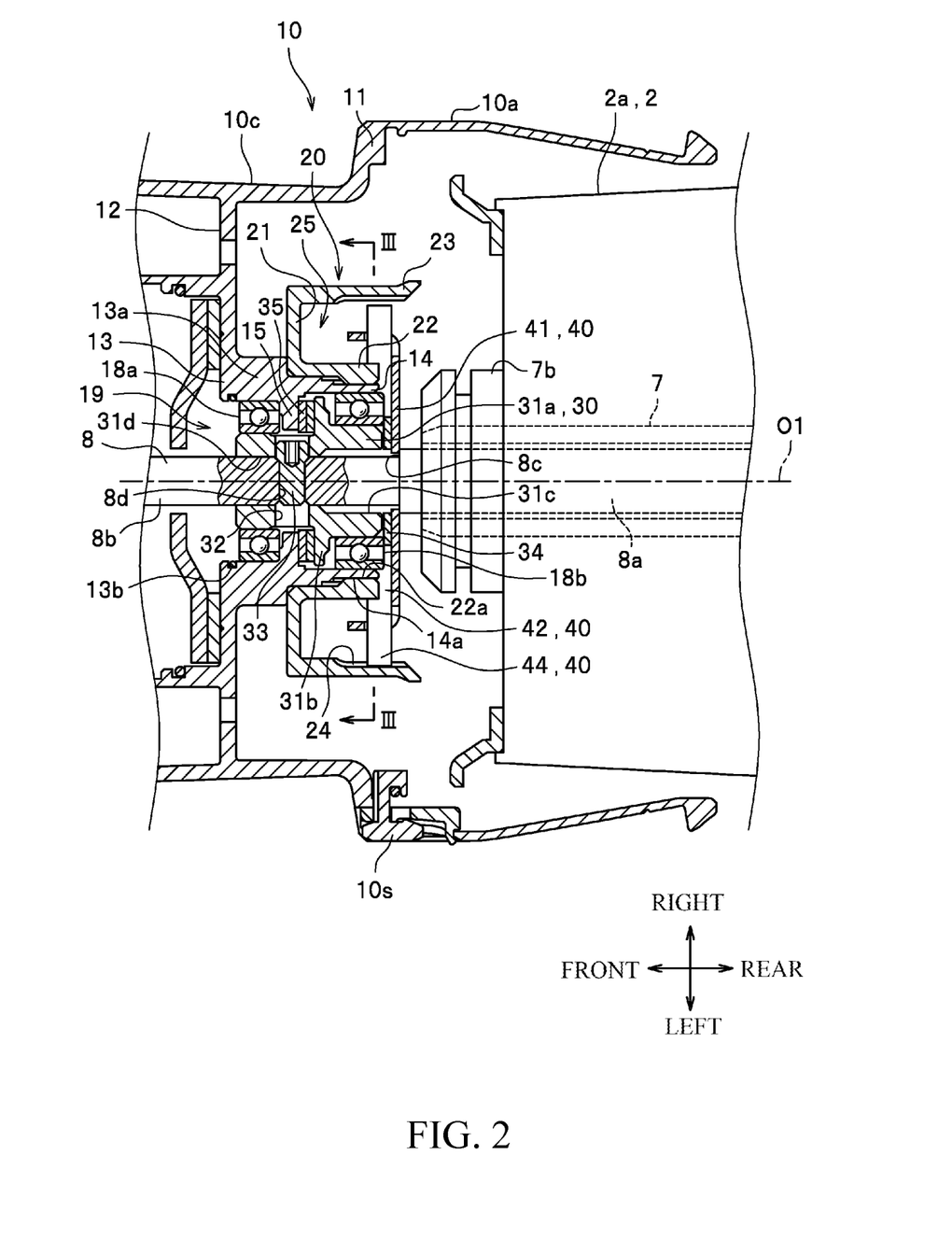
FIG. 2 is a partially omitted enlarged transverse sectional view illustrating a sound generator included in a spool according to the embodiment of the present disclosure, and a sound generation member installed on a spool shaft.

A spool of a fishing spinning reel according to an embodiment of the present disclosure is described below with reference to the drawing as appropriate. In the description of the embodiment, when "up/down" or "front/rear" is referred to, the direction illustrated in FIG. 1 is used as a reference. When "left/right" is referred to, the direction illustrated in FIG. 2 is used as a reference.

As illustrated in FIG. 1, principally, a fishing spinning reel R1 comprises a reel body 1 that includes a leg 1A that is used for mounting on a not-illustrated fishing rod, a rotor 2 that is rotatably provided on a front side of the reel body 1, and a spool 10 that is provided to be movable in a front-side/rear-side direction in synchronization with a rotational motion of the rotor 2.

The reel body 1 rotatably supports a handle shaft 3 with a not-illustrated bearing interposed therebetween, and a handle 4 is installed at a protrusion end of the handle shaft 3. A winding-up operation is performed on the handle 4. A shaft tube is whirl-stopped and fixed to the handle shaft 3. A drive gear 6 has been formed integrally with this shaft tube, and the drive gear 6 includes internal teeth that are used to drive the rotor 2 for winding up. The drive gear 6 meshes with a pinion gear 7a of a driving shaft tube 7, and the driving shaft tube 7 extends in a direction that is orthogonal to the handle shaft 3, and includes a cavity that extends in an axial direction.

The driving shaft tube 7 is rotatably supported by the reel body 1 with a bearing interposed therebetween, and a spool shaft 8 is inserted into the cavity of the driving shaft tube 7 to be movable in the axial direction. The spool shaft 8 extends in the direction that is orthogonal to the handle shaft 3, and a spool 10 is installed on a distal end side of the spool shaft 8.

At a rear end of the spool shaft 8, a publicly known oscillating mechanism 9 is provided, and the oscillating mechanism 9 is used to move the spool shaft 8 to a front side or a rear side.

The driving shaft tube 7 extends toward a side of the spool 10, and the rotor 2 is installed at a front end of the driving shaft tube 7 by using a nut 7b (see FIG. 2). Note that in the driving shaft tube 7, rotation in a reverse direction (rotation in the fishing line releasing direction) is regulated by a not-illustrated one-way clutch.

The rotor 2 comprises a cylinder 2a (see FIG. 2) that is located in a skirt 10a of the spool 10, and a pair of arms 2b and 2c. At front ends of the respective arms 2b and 2c, bail support members 2d and 2e are supported to be rotationally movable between the fishing line winding-up position and the fishing line releasing position, and a bail 2f is arranged between these bail support members 2d and 2e. The bail 2f picks up a fishing line in a released state. In the bail 2f, one proximal end is installed on a line roller 2g that is provided integrally with the bail support member 2d, and another proximal end is installed on the bail support member 2e.

The spool 10 comprises a fishing line winding drum 10c between the skirt 10a and a front side flange 10b, and has a cylindrical shape, as illustrated in FIG. 1. A not-illustrated fishing line is wound around the fishing line winding drum 10c. Details of the spool 10 will be described later.

In the fishing spinning reel R1, as described above, if a winding-up operation is performed on the handle 4, the rotor 2 is driven to rotate by using the drive gear 6 and the pinion gear 7a, and the spool 10 is moved to the front side or the rear side by using the pinion gear 7a and the oscillating mechanism 9. As a result of this, the not-illustrated fishing line is evenly wound around the fishing line winding drum 10c of the spool 10 by using a line roller 2g.

Figure 4:
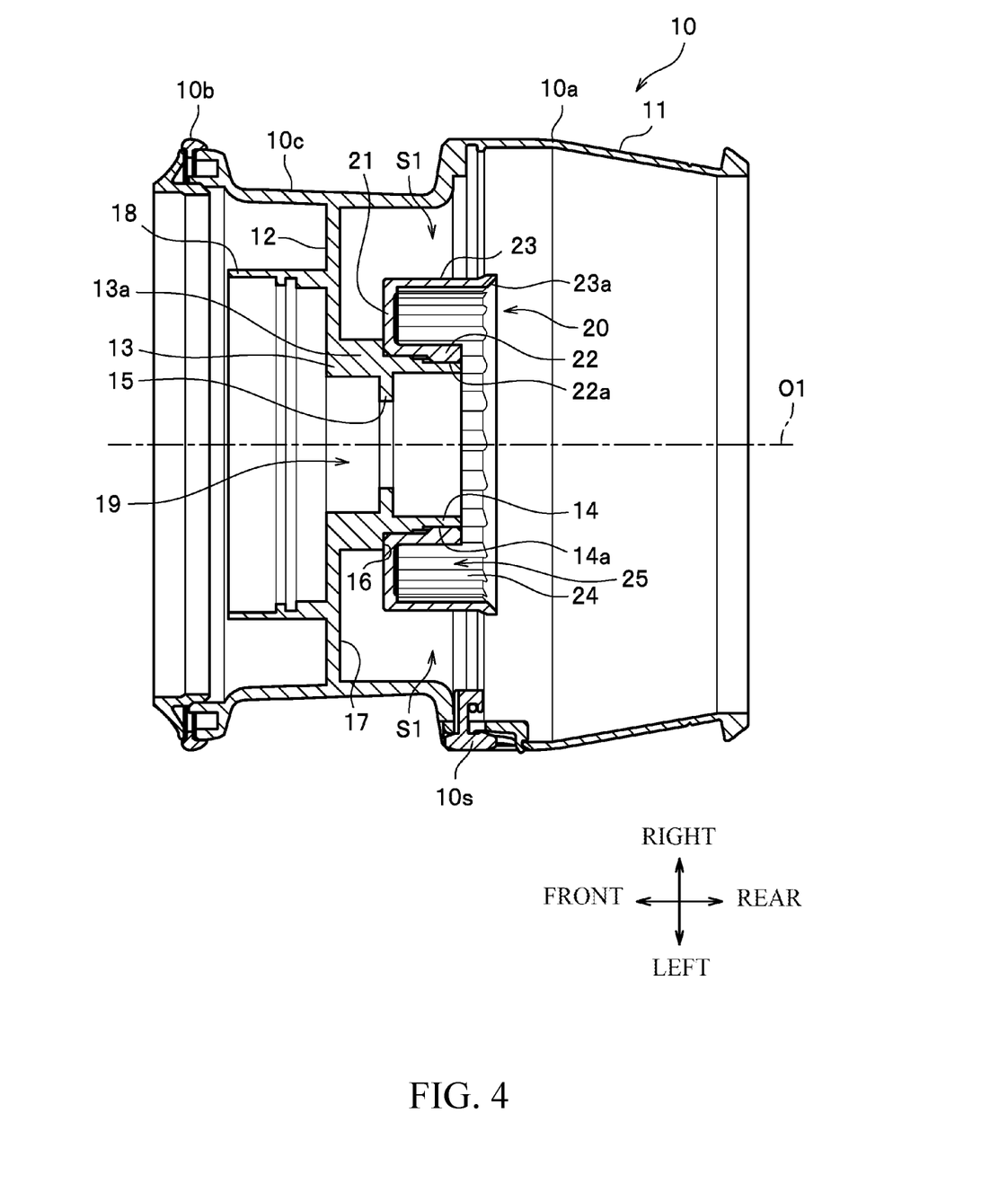
FIG. 4 is an enlarged vertical sectional view illustrating the spool according to the embodiment of the present disclosure.

Next, details of the spool 10 are described. The spool 10 comprises a spool body 11, and a sound generator 20 that is provided separately from the spool body 11, as illustrated in FIGS. 2 and 4. Note that in the present embodiment, the spool body 11 and the sound generator 20 are separately provided, but these may be integrally provided. The spool body 11 is installed on the spool shaft 8 by using a holding member 30, as illustrated in FIG. 2. The spool shaft 8 comprises a drum 8a having a circular cross section, and a distal end 8b having a roughly oval-shaped cross section. Note that in the distal end 8b, an outer peripheral face includes a straight portion and a curved portion. A step 8c is disposed in a boundary portion between the drum 8a and the distal end 8b.

The holding member 30 is installed on the distal end 8b. At the distal end 8b, an openwork hole (or a through-hole) 8d that passes through in a direction perpendicular to the axis is disposed. A latching pin 33 that latches the holding member 30 is inserted into the openwork hole (or a through-hole) 8d.

The holding member 30 has a tube shape that the distal end 8b of the spool shaft 8 is inserted into, and includes a base 31a and a flange 31b. The base 31a includes a circular inner peripheral portion 31c (see FIG. 3) and an inner peripheral portion 31d (see FIG. 2). The circular inner peripheral portion 31c has an inner diameter that is mounted on the curved portion of the roughly oval cross section of the distal end 8b. The inner peripheral portion 31d is disposed on a front side of the circular inner peripheral portion 31c, is mounted on both the straight portion and the curved portion of the roughly oval cross section of the distal end 8b, and has a roughly oval cross section. A through-hole 32 that the latching pin 33 is inserted into is disposed in the inner peripheral portion 31d. The through-hole 32 is connected to the openwork hole (or a through-hole) 8d of the distal end 8b of the spool shaft 8. The latching pin 33 is latched onto the openwork hole (or a through-hole) 8d through the through-hole 32, and therefore the holding member 30 is installed in such a way that the holding member 30 fails to move in the axial direction, and fails to rotate in a direction around the axis.

Figure 3:
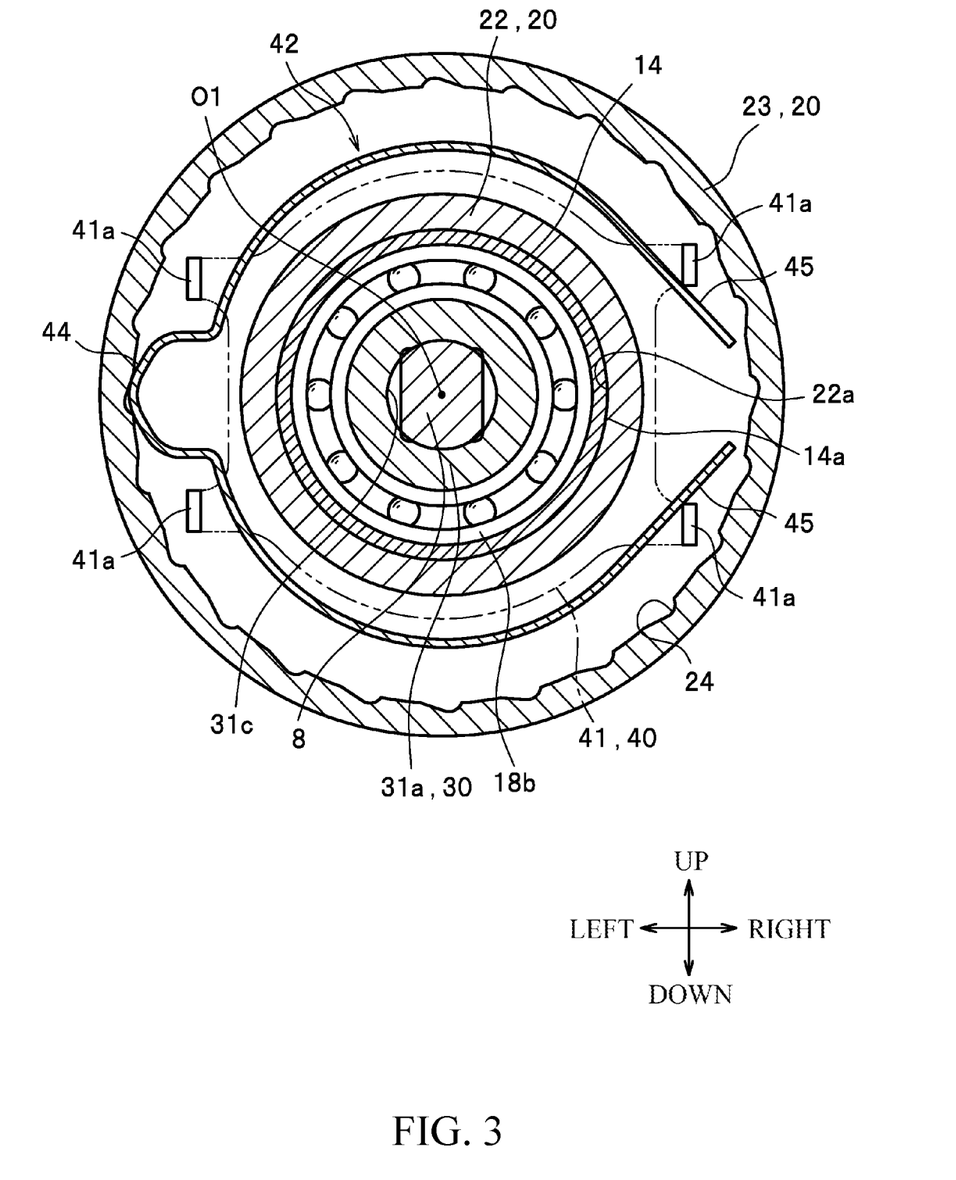
FIG. 3 is a diagram illustrating the sound generator included in the spool according to the embodiment of the present disclosure, and the sound generation member installed on the spool shaft, and is a sectional view along line of FIG. 2.

A rear bearing 18b including a bearing is externally fitted onto an outer face in a rear portion of the base 31a. The rear bearing 18b is held to not come off by using a washer 34 that is disposed on a rear end face of the base 31a. A support portion 41 included in the sound generation member 40 is sandwiched between the washer 34 and the step 8c of the spool shaft 8. The sound generation member 40 includes the support portion 41 made of metal, and a click claw spring 42 that is supported by the support portion 41, and is made of metal.

The support portion 41 includes four hooks 41a that extend on both left-hand and right-hand sides, as illustrated in FIG. 3. The click claw spring 42 is a member that is made of metal and has a thin plate shape, and has elasticity. The entirety of the click claw spring 42 has a roughly U-shape in a front view, and the click claw spring 42 includes a protrusion portion 44 that protrudes to a left-hand side (in a radially outward direction). A distal end of the protrusion portion 44 has a curved face. The protrusion portion 44 is disposed between the hooks 41a on the left-hand side. Furthermore, both ends 45 of the click claw spring 42 are latched onto the hooks 41a on the right-hand side.

Inside the spool body 11, a support wall 12 and a middle wall 13 are disposed as a structure for holding the spool body 11 on the holding member 30, as illustrated in FIG. 2. The support wall 12 has a roughly disc shape, and integrally extends from an inner face of the fishing line winding drum 10c toward an inside in a radial direction. The middle wall 13 has a cylindrical shape, and integrally extends from an extending end of the support wall 12 toward a rear side. In a rear portion of the middle wall 13, the sound generator 20 is installed by using the screwing structure described later. Note that on a front side of the support wall 12, a drag housing portion 18 (see FIG. 4) is disposed. The drag housing portion 18 houses a drag device T (see FIG. 1), and has a cylindrical shape. The drag device T is a device that applies a braking force to a pulled-out fishing line when the fish is hooked in real fishing. A drag nob Ta (see FIG. 1) of the drag device T is adjusted, and therefore a desired braking force can be applied to the spool 10 that is rotatably held by the spool shaft 8.

The middle wall 13 is disposed concentrically with center axis O1 of the spool body 11, as illustrated in FIG. 4. Inside the middle wall 13, a through-hole 19 is disposed, as illustrated in FIG. 2, and part of the holding member 30 and the distal end 8b of the spool shaft 8 are inserted into the through-hole 19. The middle wall 13 includes a large-diameter portion 13a that is continuous to the support wall 12, and a small-diameter portion 14 that is continuous to a rear side of the large-diameter portion 13a, as illustrated in FIG. 2. On an outer face of the middle wall 13, a step 16 (see FIG. 4) is disposed in a boundary portion between the large-diameter portion 13a and the small-diameter portion 14.

On an inner peripheral face of the large-diameter portion 13a, a partition wall 15 is disposed to protrude, and the partition wall 15 partitions the inner peripheral face of the large-diameter portion 13a into a front portion and a rear portion, and has a ring shape. On a front side of the partition wall 15, a front bearing 18a including a bearing is internally fitted onto the inner peripheral face of the large-diameter portion 13a. The front bearing 18a is held to not come off by using a coming-off prevention member 13b and the partition wall 15, and the coming-off prevention member 13b is latched onto the inner peripheral face of the large-diameter portion 13a. An inner ring of the front bearing 18a is mounted on a front outer peripheral face of the base 31a of the holding member 30. Furthermore, a rear face of the partition wall 15 abuts onto a front face of the flange 31b of the holding member 30 with two washers 35 interposed therebetween.

Between the holding member 30 and the middle wall 13, the front bearing 18a and the rear bearing 18b are arranged in the front-side/rear-side direction. Therefore, the spool body 11 is stably held at the distal end 8b of the spool shaft 8 by using two bearings, the front bearing 18a and the rear bearing 18b.

The small-diameter portion 14 is a portion on which the sound generator 20 is installed, as illustrated in FIGS. 2 and 4. On an outer peripheral face of a rear portion of the small-diameter portion 14, a male thread 14a is disposed, and the male thread 14a functions as a thread of the screwing structure. The male thread 14a is disposed concentrically with the through-hole 19, when viewed from the axial direction of the through-hole 19. In other words, the male thread 14a is disposed on a concentric circle of a circle having center axis O1 of the spool as a center. Note that in the present embodiment, the sound generator 20 is screwed onto the small-diameter portion 14, but may be joined by pressing. On the other hand, on an inner peripheral face of the rear portion of the small-diameter portion 14, an outer ring of the rear bearing 18b that is externally fitted onto a side of the holding member 30 is mounted.

The sound generator 20 is a member that is installed on the middle wall 13 of the spool body 11 by using the screwing structure, and has a cylindrical shape. The entirety of the sound generator 20 is formed by using resin, for example, fiber-reinforced resin including carbon fiber, glass fiber, or the like. Stated another way, a difference in hardness is generated between the sound generator 20 and the click claw spring 42 serving as a sound generation member. The sound generator 20 and the sound generation member 40 (the click claw spring 42) are engaged with each other, and therefore a spool sound generation mechanism is configured.

The sound generator 20 includes a bottom wall 21 having a ring shape, an inner peripheral wall 22 that extends from a portion on an inside in the radial direction of the bottom wall 21 to a rear side, and an outer peripheral wall 23 that is disposed to be spaced on an outside in the radial direction of the inner peripheral wall 22, and extends from a portion on an outside in the radial direction of the bottom wall 21 to the rear side, as illustrated in FIGS. 2 and 4. The sound generator 20 comprises a recessed portion (an annular recessed space) 25 that is surrounded by the bottom wall 21, the inner peripheral wall 22, and the outer peripheral wall 23. The recessed portion 25 is annularly open toward the rear side, as illustrated in FIG. 4.

On the entirety of an inner peripheral face of the inner peripheral wall 22, a female thread 22a that functions as a screwed thread of the screwing structure is disposed, as illustrated in FIGS. 2 and 4. The female thread 22a can be screwed into the male thread 14a of the middle wall 13.

Figure 5:
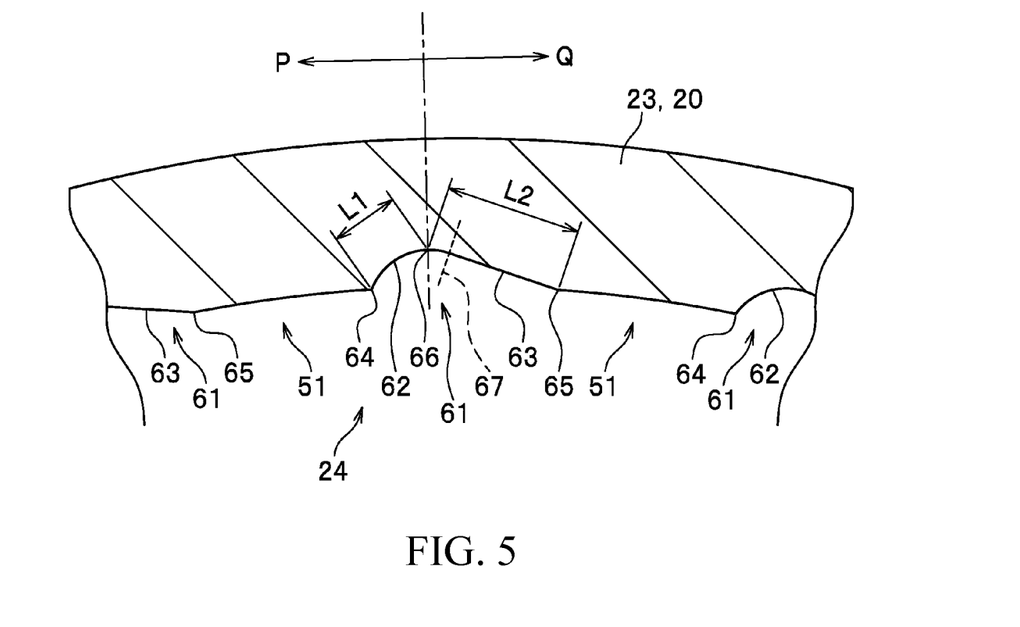
FIG. 5 is an enlarged view illustrating a ratchet groove of the sound generator according to the embodiment of the present disclosure.

As illustrated in FIG. 3, on the inner peripheral face of the outer peripheral wall 23, a ratchet groove 24 is disposed. The protrusion portion 44 of the click claw spring 42 elastically abuts onto the ratchet groove 24. As illustrated in FIG. 5, the ratchet groove 24 comprises a protrusion 51 and a recess 61 that are alternatingly disposed on the entire circumference of the inner peripheral face of the outer peripheral wall 23. The recess 61 is disposed to be recessed in the radially outward direction. A portion that is disposed between adjacent recesses 61 is the protrusion 51. The recess 61 includes a first face 62 and a second face 63. It is assumed that a corner serving as a boundary between the recess 61 and the protrusion 51 located on one side of the recess 61 is a first apex 64. It is also assumed that a corner serving as a boundary between the recess 61 and the protrusion 51 located on the other side of the recess 61 is a second apex 65. It is also assumed that in the recess 61, a position that is farthest from center axis O1 (see FIG. 4) of the spool is a deepest portion 66. Furthermore, a boundary between the first face 62 and the second face 63 is illustrated as a virtual line 67.

It is assumed that one side in a circumferential direction with the deepest portion 66 as a boundary is a P-direction, and the other side is a Q-direction. The P-direction means a direction in which the spool 10 rotates when the fish has been hooked in real fishing, and the fishing line has been sent out. The second face 63 is disposed in the Q-direction (on an opposite side of the direction in which the spool 10 rotates when the fishing line has been sent out) in the recess 61.

The first face 62 is a curved face that is continuous from the first apex 64 to the virtual line 67 (a face having an arc shape). On the other hand, the second face 63 is an inclined face that is continuous from the virtual line 67 to the second apex 65. A length(distance) L2 from the second apex 65 to the deepest portion 66 is longer than a length(distance) L1 from the first apex 64 to the deepest portion 66. Stated another way, the deepest portion 66 is located closer to the first apex 64 than a center in a width direction of the recess 61 (on a P-direction side). Therefore, a shape of the recess 61 is laterally asymmetrical.

Note that under the assumption that the relationship described above between the lengths(distances) L1 and L2 is satisfied, the first face 62 may be an inclined face, and the second face 63 is a curved face (a face having an arc shape). Furthermore, under the assumption that the relationship described above between the lengths L1 and L2 is satisfied, both the first face 62 and the second face 63 may be curved faces, or may be inclined faces.

A rear end of the outer peripheral wall 23 protrudes to a rearer side than a rear end of the inner peripheral wall 22, and is disposed in a region inside the skirt 10a by using a space between the outer peripheral wall 23 and the cylinder 2a of the rotor 2 on a rear side, as illustrated in FIGS. 2 and 4. Therefore, a region of the recessed portion 25 that is surrounded by the outer peripheral wall 23 is expanded toward the rear side. This contributes to improvements in a sound generation effect. Furthermore, the rear end of the outer peripheral wall 23 has a diameter that increases in a tapered manner, and functions as a guiding portion of the click claw spring 42 at the time of assembly.

On an outside in the radial direction of the outer peripheral wall 23, a clearance Si is disposed between the outer peripheral wall 23, and the fishing line winding drum 10c and the skirt 10a (a line stopper 10s) of the spool body 11, as illustrated in FIG. 4. The clearance Si functions as a finger insertion portion at a time when the sound generator 20 is installed on or removed from the spool body 11. Furthermore, the clearance Si causes sound of the sound generator 20 to easily resonate.

When the sound generator 20 is installed on the spool body 11, the sound generator 20 is inserted into the skirt 10a from a rear side of the spool body 11, the inner peripheral wall 22 of the sound generator 20 is aligned with the small-diameter portion 14 of the middle wall 13 of the spool body 11, and the sound generator 20 is rotated in a screwing direction. As a result of this, the female thread 22a is screwed into the male thread 14a, and the sound generator 20 is installed on the spool body 11 (the middle wall 13). Screwing causes the bottom wall 21 of the sound generator 20 to abut onto the step 16 of the middle wall 13, and this abutting causes the sound generator 20 to be pressed against and fixed to the middle wall 13. The bottom wall 21 of the sound generator 20 comes into contact with the step 16, and this can avoid breakage due to excessively fastening of the sound generator 20. Note that, by releasing screwing after installation, the sound generator 20 can be removed from the spool body 11.

In a state where the sound generator 20 has been installed on the spool body 11, the rear bearing 18b, the sound generator 20, and an outer diameter of the spool body 11 (the fishing line winding drum 10c or the skirt 10a) are disposed in this order in a radially outward direction from an axial center of the through-hole 19 (center axis O1 of the spool body 11), as illustrated in FIG. 2.

Figure 6:
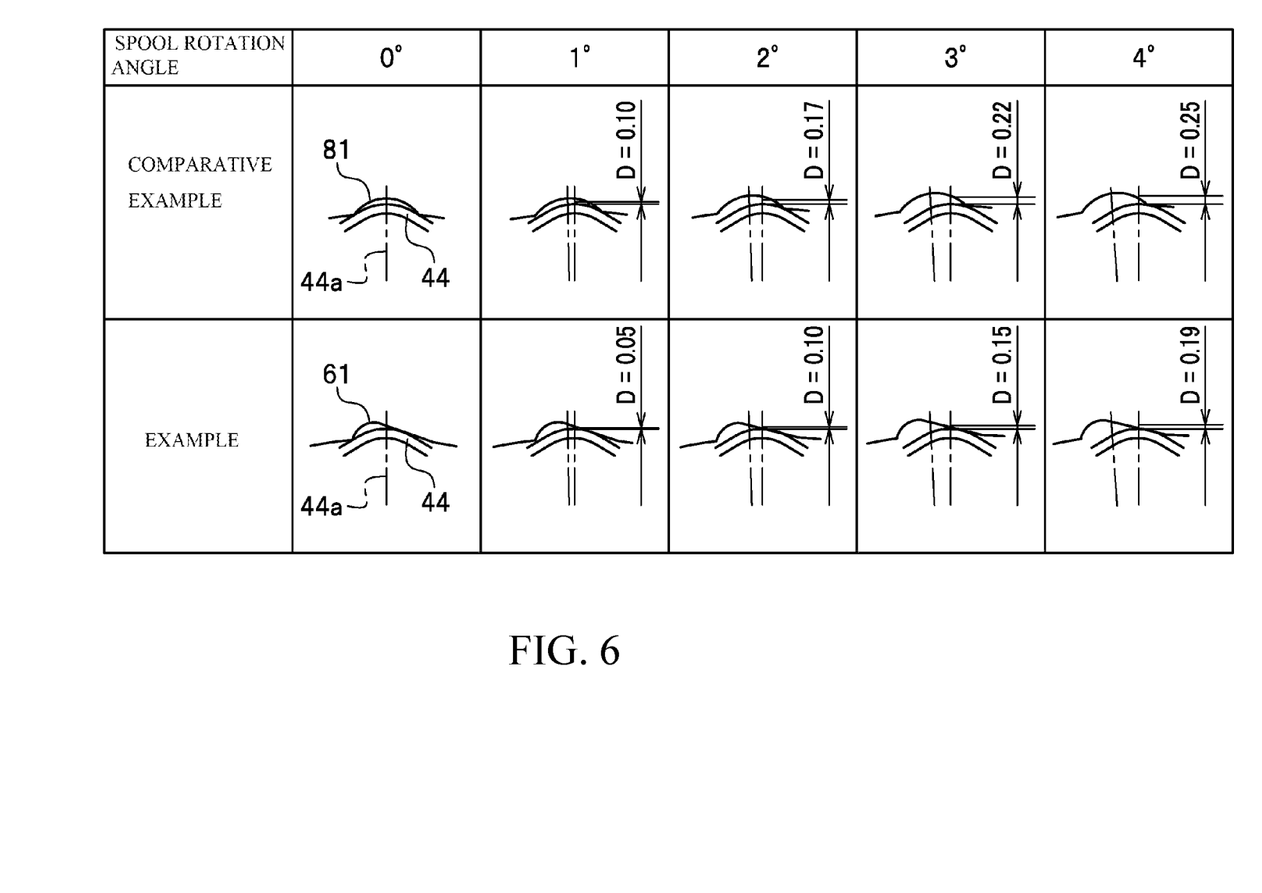
FIG. 6 is a comparison table in which a working state of a spool sound generation mechanism is compared between a comparative example and an example.

Next, the workings of the spool sound generation mechanism are described in comparison between a comparative example and an example. FIG. 6 is a comparison table in which a working state of the spool sound generation mechanism is compared between the comparative example and the example. An upper row of FIG. 6 indicates the comparative example (the aspect of JP 2005-073670 A), and a lower row indicates the example (the embodiment of the present disclosure). Each drawing illustrates an engaged state at a time when a spool rotation angle increases by 1° in order from a left-hand side to a right-hand side. An amount of deformation D illustrated in the drawings indicates an amount of deformation of the protrusion portion 44. The amount of deformation D uses, as a reference, a position of a distal end of the protrusion portion 44 at the time of a spool rotation angle of 0°, and indicates a distance (a distance of movement in the radially outward direction) from the reference to the distal end of the protrusion portion 44. When the fishing line is sent out, the click claw spring 42 does not rotate, but the sound generator 20 (the spool 10) rotates, and therefore sound is emitted.

Figure 7:
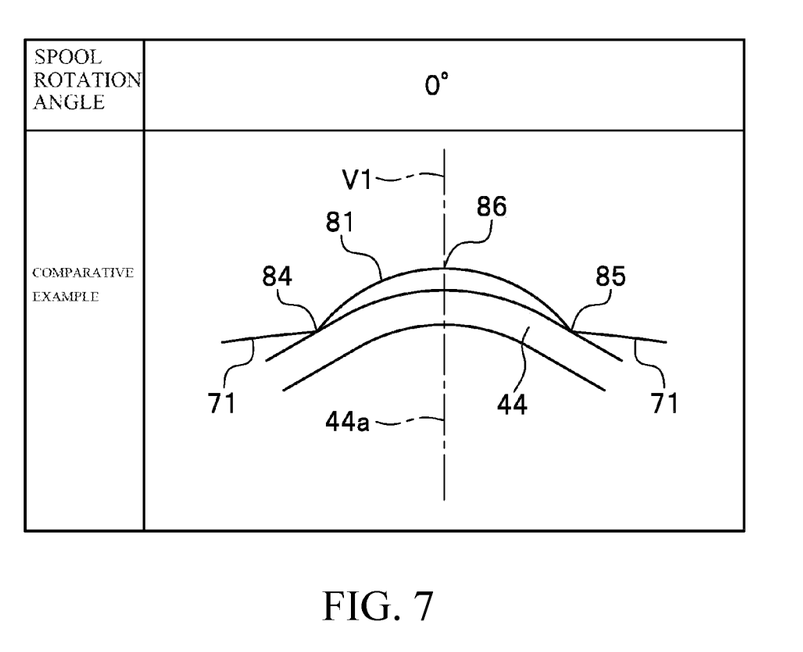
FIG. 7 is an enlarged view illustrating the comparative example at the time of a spool rotation angle of 0°.
Figure 8:
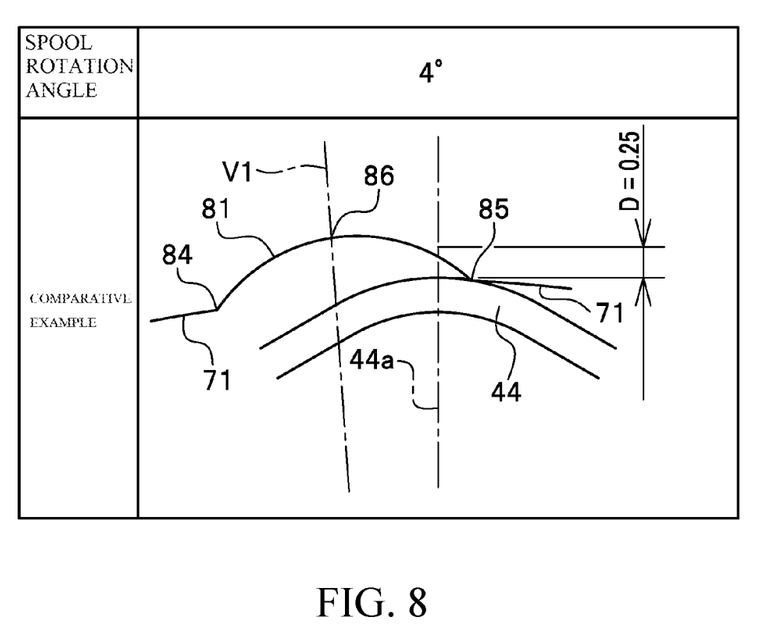
FIG. 8 is an enlarged view illustrating the comparative example at the time of a spool rotation angle of 4°.

FIG. 7 is an enlarged view illustrating the comparative example at the time of a spool rotation angle of 0°. FIG. 8 is an enlarged view illustrating the comparative example at the time of a spool rotation angle of 4°. As illustrated in FIGS. 7 and 8, a ratchet groove in the comparative example includes a protrusion 71 and a recess 81 that are alternatingly disposed in a circumferential direction of an inner peripheral face. A shape of the recess 81 is laterally symmetric, and is a curved face having a semi-arc shape. It is assumed that respective boundaries between the recess 81 and the protrusion 71 that is adjacent to the recess 81 are a first apex 84 and a second apex 85. It is assumed that a center line in the width direction of the recess 81 is center line V1.

As illustrated in FIG. 7, when a spool rotation angle of the comparative example is 0°, a center line 44a, which is a center line in the width direction of the protrusion portion 44 of the click claw spring 42, is located on center line V1 of the recess 81. In this case, the protrusion portion 44 is fitted most deeply into the recess 81. Furthermore, a curvature of the recess 81 is greater than a curvature of the distal end of the protrusion portion 44. Therefore, a deepest portion 86 of the recess 81 does not come into contact with the protrusion portion 44, and the protrusion portion 44 abuts onto (comes into point contact with) both the first apex 84 and the second apex 85. As illustrated in FIG. 6, when the spool rotation angle is 1 to 3°, the protrusion portion 44 slides in contact with the second apex 85. Then, as illustrated in FIG. 8, when the spool rotation angle is 4°, the center line 44a of the protrusion portion 44 is located near the second apex 85 of the recess 81, and an amount of deformation D is 0.25 mm.

Figure 9:
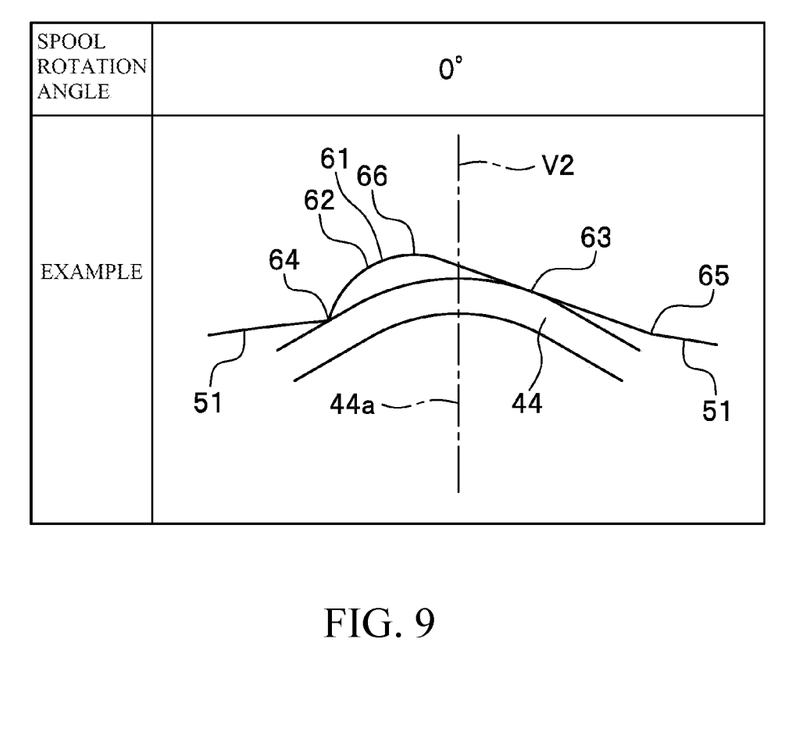
FIG. 9 is an enlarged view illustrating the example at the time of a spool rotation angle of 0°.
Figure 10:
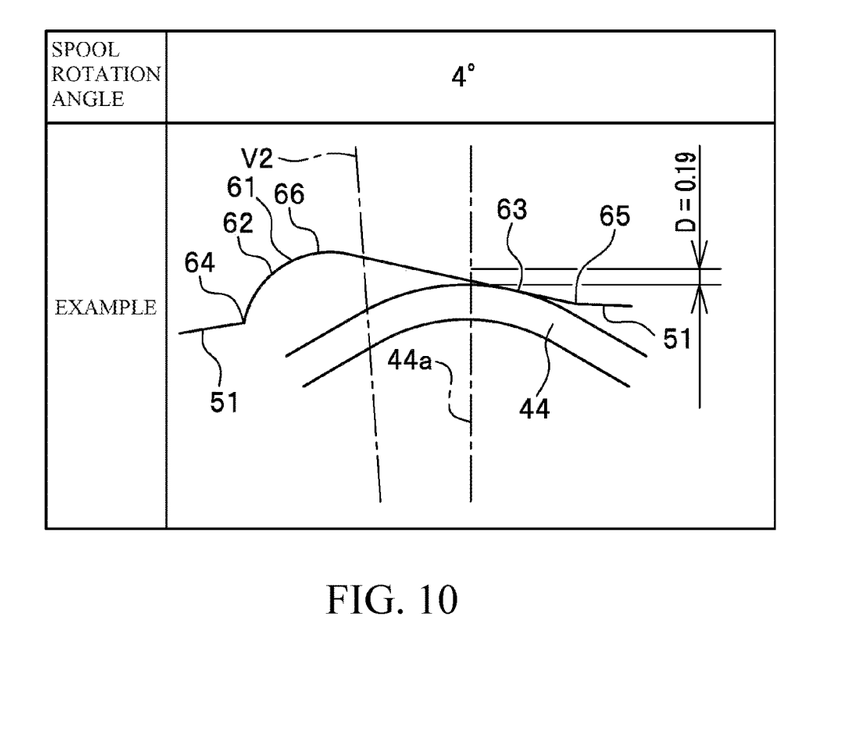
FIG. 10 is an enlarged view illustrating the example at the time of a spool rotation angle of 4°.

FIG. 9 is an enlarged view illustrating the example at the time of a spool rotation angle of 0°. FIG. 10 is an enlarged view illustrating the example at the time of a spool rotation angle of 4°. As illustrated in FIGS. 9 and 10, in the example, the recess 61 has a laterally asymmetric shape including the deepest portion 66 that is eccentric, as described above, and includes the first face 62 that is a curved face, and the second face 63 that is an inclined face. A radius of curvature of the first face 62 is smaller than a radius of curvature of the recess 81 in the comparative example illustrated in FIG. 7. A size of a depth of the deepest portion 66 of the recess 61 is the same or almost the same as a size of a depth of the deepest portion 86 of the recess 81. It is assumed that a center line in the width direction of the recess 61 is center line V2.

When a spool rotation angle of the example is 0°, the center line 44a of the protrusion portion 44 of the click claw spring 42 is located on center line V2 of the recess 61. In this case, the protrusion portion 44 is fitted most deeply into the recess 61. Furthermore, in this case, the protrusion portion 44 does not come into contact with the deepest portion 66 and the second apex 65, and abuts onto the first apex 64 and the second face 63. The center line 44a of the protrusion portion 44 is located on the Q-direction side of the deepest portion 66. As illustrated in FIG. 6, when the spool rotation angle is 1 to 3°, the protrusion portion 44 slides along the second face 63. Then, as illustrated in FIG. 10, when the spool rotation angle is 4°, the center line 44a of the protrusion portion 44 is located near the second apex 65 of the recess 61, and an amount of deformation D is 0.19 mm. Specific illustration is omitted, but in the example, when the spool rotation angle is 7°, an amount of deformation D is 0.25 mm. The spool 10 further rotates, the protrusion portion 44 falls from the first apex 64 of an adjacent recess 61 to another recess 61, and the spool rotation angle becomes 0° (part of the protrusion portion 44 comes into contact with the second face 63). At this time, click sound is emitted.

According to the present embodiment described above, the length L2 of the recess 61 is longer than the length L1. Therefore, the protrusion portion 44 of the click claw spring 42 smoothly moves from the second face 63 to the second apex 65 on the Q-direction side. In other words, a distance of movement in the radially outward direction of the protrusion portion 44 relative to the spool rotation angle is shorter than a distance of movement in the comparative example, and an amount deformation of the click claw spring 42 is also smaller. As a result of this, resistance in a drag operation can be decreased.

Furthermore, a depth is provided in the radially outward direction on a side of the first face 62, and therefore an acoustic space required for sound generation (a space surrounded by the recess 61 and the protrusion portion 44) can be secured. As a result of this, resistance in a drag operation can be decreased, and satisfactory sound having preciseness can be emitted. Furthermore, the protrusion portion 44 of the click claw spring 42 smoothly moves on a side of the second face 63. This can avoid abrasion of each sliding portion, and in particular, abrasion of the second face 63 and the second apex 65. Therefore, abrasion of the ratchet groove 24 can be avoided, and a deterioration in sound generation performance can be avoided.

Furthermore, the second face 63 may be a curved face. However, by configuring the second face 63 to be an inclined face, the protrusion portion 44 of the click claw spring 42 can be smoothly moved from the second face 63 to the second apex 65.

Furthermore, the click claw spring 42 including the protrusion portion 44 that protrudes in the radially outward direction is provided. Therefore, the click claw spring 42 is easily engaged with the ratchet groove 24, and sound generation property can be further improved. Moreover, under the assumption that a relationship between the lengths L1 and L2 is satisfied, a radius of curvature of the first face 62 or an angle of inclination of the second face 63 can be appropriately set. Therefore, a pitch number of the ratchet groove 24 (the number of recesses 61) can be designed in a manner that is similar to a manner of a conventional technology, and sound generation performance or principal drag performance that is similar to sound generation performance or principal drag performance of the convention technology can be achieved.

Furthermore, as described in the present embodiment, the sound generator 20 is provided by using a space in the rear portion of the spool 10 that enables an increase in diameter. Therefore, a pitch number of the ratchet groove 24 can be increased. As a result of this, a sound generation pitch according to rotation of the spool 10 can also be increased, and sound generation having preciseness can be achieved.

The embodiment of the present disclosure has been described above, but design change can be appropriately made without contradicting the spirit of the present disclosure. For example, the spool body 11 and the sound generator 20 may be integrally provided, or may be separately provided. The sound generator 20 may be provided in another portion, if the sound generator 20 is disposed on the inner peripheral face of the spool body 11. Furthermore, in the present embodiment described above, a boundary between the first face 62 and the second face 63 (see the virtual line 67) has been set to be located on the Q-direction side of the deepest portion 66. However, the boundary may be set to be located in a position that overlaps the deepest portion 66, or may be set to be located on a P-direction side of the deepest portion 66.

REFERENCE SIGNS LIST

8 Spool shaft
10 Spool
11 Spool body
20 Sound generator
24 Ratchet groove
51 Protrusion
61 Recess
62 First face
63 Second face
64 First apex
65 Second apex
66 Deepest portion
L1 Length
L2 Length
R1 Fishing spinning reel

What is claimed is:
1. A fishing spinning reel comprising:
a spool that is rotatably and frictionally coupled to a distal end of a spool shaft by a drag device, the spool shaft being in a reel body; and
a spool sound generation mechanism in which a sound generator and a sound generation member are engaged with each other, the sound generator being on an inner peripheral face of the spool and having an uneven shape, and the sound generation member being in the spool shaft,
wherein the sound generator comprises a protrusion and a recess that alternate in a circumferential direction,
the recess comprises a first apex that is a boundary with the protrusion that is adjacent to the recess on one side, a first face that is continuous to the first apex and is recessed in a radially outward direction, a second face that is continuous to the first face, and a second apex that is continuous to the second face and is a boundary with the protrusion that is adjacent to the recess on the other side,
the second face is on an opposite side of a direction in which the spool rotates when a fishing line has been sent out, and
a length L2 from the second apex to a deepest portion of the recess is longer than a length L1 from the first apex to the deepest portion of the recess, wherein
the sound generation member comprises a click claw spring that comprises a protrusion portion that protrudes in the radially outward direction, and the protrusion portion is engaged with the sound generator.

2. The fishing spinning reel according to claim 1, wherein the first face is a curved face, and the second face is an inclined face.

* * * * *